United States Patent [19]
Deimel et al.

[11] 4,241,560
[45] Dec. 30, 1980

[54] APPARATUS FOR FOLDING AND CLOSING THE TOPS OF FOLDING CARTONS

[75] Inventors: Gerhard Deimel, Opladen; Paul Schmidt, Dusseldorf, both of Fed. Rep. of Germany

[73] Assignee: Jagenberg Werke AG, Dusseldorf, Fed. Rep. of Germany

[21] Appl. No.: 22,006

[22] Filed: Mar. 19, 1979

[30] Foreign Application Priority Data

Mar. 20, 1978 [DE] Fed. Rep. of Germany ....... 2812138

[51] Int. Cl.³ .................. B65B 7/04; B65B 7/06; B65B 51/22
[52] U.S. Cl. ..................................... 53/373; 53/379; 53/DIG. 2
[58] Field of Search .................. 53/373, 379, DIG. 2; 156/73.1

[56] References Cited
U.S. PATENT DOCUMENTS 3,996,724  12/1976  Smith ................................ 53/373 X

FOREIGN PATENT DOCUMENTS 2310260  12/1976  France ........................................ 53/379

Primary Examiner—Robert D. Baldwin
Attorney, Agent, or Firm—Sprung, Felfe, Horn, Lynch & Kramer

[57] ABSTRACT

An apparatus for folding and closing to top of folding cartons prefabricated from cut boxboard stock having an inner thermoplastic-resin liner includes a stepwise conveyor for conveying the folding cartons in a row, upright, with the fillet seam of the cartons perpendicular to the direction of travel, and a single folding, pressing and welding station having ultrasonic welding means including a vibratable tip and a folding, pressing and welding tool. The tool includes a pair of jaws and the tip, which are mounted for movement toward each other in the manner of tongs, wherein one of said jaws includes a folding wedge and an anvil above said folding wedge, and the other jaw is configured as a folding and clamping wedge. The jaws and holder are mounted on a common holder for movement into and out of engagement with the fillet seam of each container on the conveyor.

9 Claims, 8 Drawing Figures

APPARATUS FOR FOLDING AND CLOSING THE TOPS OF FOLDING CARTONS

BACKGROUND OF THE INVENTION

The invention relates to an apparatus for folding and closing the tops of folding cartons which are prefabricated from cut boxboard stock having an inner thermoplastic-resin liner, and in particular a liner with a composite structure of thermoplastic-resin layer/aluminum foil/thermoplastic-resin layer, comprising a folding station, a pressing and ultrasonic welding station, and conveying means which carries the folding cartons in a row, upright, to the folding station and to the pressing-/welding station.

In a prior-art apparatus of this type, the top of every folding carton is so folded in a first station that the fillet seam is parallel to the direction of travel. The folding carton then leaves this folding station and reaches the pressing/welding station as such. On the way to the latter, the folded top is held in that position by guide rails which laterally engage the fillet seam. The tools are constructed as an anvil and ultrasonic welding horn, whereby the inner liner of thermoplastic resin is heated and the tools also serve to press the fillet-seam areas to be welded together during the sealing operation and, following the latter, to hold them together for a certain cooling-off period. To this end, both the anvil and the ultrasonic welding horn are provided with flat contact surfaces.

SUMMARY OF THE INVENTION

The object of the invention is to provide an apparatus of the type outlined above whereby the folding and sealing operation performed on the top of the folding carton can be carried out in less time and with less fixturing.

In accordance with the invention, this object is accomplished by combining the folding station and the pressing/welding station into one station, with the folding tools and the pressing/welding tools consisting of a pair of jaws or tips adapted to be moved toward each other in the manner of tongs, one of the jaws carrying a folding wedge and, above the folding wedge, an anvil, and the other jaw being constructed as a folding and clamping wedge and being mounted, together with an ultrasonic generator/transducer assembly cooperating with the anvil, on a common holder.

In the apparatus in accordance with the invention, folding of the top and heating as well as welding with pressing of the fillet seam occur in a single station. In contrast to the prior-art station, just one drive operating in the manner of tongs is needed. This means a saving not only fixturewise but also in handling time for the folding carton, since the tongslike motion, heretofore required twice, first for the folding operation, then for the clamping and pressing/welding operation, in this case needs to be executed but once. Another substantial advantage is that the intermediate conveying operation hitherto required between folding station and pressing-/welding station, and during which the fillet seam was held together by the guide rails, is eliminated. The elimination of this conveying operation is of importance in that it permits the cartons to be conveyed transversely, that is to say, with their long sides, and hence the fillet seam, at right angles to the direction of travel. This is desirable because when folding cartons of rectangular cross section, which makes for an optimum stock usage to volume ratio, are used it permits them to be conveyed faster, without the liquid with which they are filled sloshing too high, than when their long sides are parallel to the direction of travel. Moreover, the combination of anvil and ultrasonic generator/transducer assembly on the one hand and of additional clamping tools offers the advantage that there will be no defects in the form of gaps in the weld even though ultrasonic welding is employed. It has been found that gaps will form, especially when cut boxboard stock is used which has an inner liner of composite structure.

In accordance with one variant of the invention, there is provided for actuation of the jaws or their holder, respectively, a disk cam on which the jaws or their holder, respectively, bear. The disk cam preferably has a steeply rising section for the folding operation and a gently rising section for the pressing operation. This differential rise allows for the different requirements of the folding and pressing operations. The folding operation requires a long path of movement at low forces, the pressing operation a short path of movement at high forces. A particularly favorable solution for the drive, from the standpoint of design, lies in constructing the cam sections for both jaws or their holder, respectively, as part of the same disk cam, driven to oscillate.

In order that the fillet-seam areas to be welded to one another may be pressed together prior to heating the thermoplastic layer without the ultrasonic generator/transducer assembly having to be cut in while full pressure is being applied, there is provided, in a further variant of the invention, a compression spring between a follower bearing on the cam sections and the holder for the ultrasonic generator/transducer assembly, a stop which becomes operative only after the force of the spring has been overcome coming into operative engagement therewith.

It has been found that a decisive factor in the production of a satisfactory weld is the pressure exerted by the ultrasonic generator/transducer assembly. To permit the pressure to be held constant even with a simple drive for the jaws using cam sections, a cylinder-piston arrangement which is under constant pressure may be provided as a pressure cushion between the holder for the ultrasonic generator/transducer assembly and the cam. To provide a means of escape for the thermoplastic material expelled in the welding operation, it is advisable to locate the anvil and the ultrasonic generator/transducer assembly at a short distance from the pressure area of the clamping tools. A V-seam directed toward the interior of the carton has been found to be particularly advantageous from the standpoint of both mechanical strength and tightness. In accordance with a further characteristic of the invention, such a V-seam can be produced when the anvil is provided with a rib of rounded cross section extending in the direction of the fillet seam, which then serves as an abutment surface for the ultrasonic generator/transducer assembly.

Since a certain pressure must be maintained in order to produce a satisfactory fillet seam, as pointed out above, certain depressions may be provided in the anvil to accommodate enlargements, for example, in individual sections of the fillet seam. When the fillet seam of the folding carton is intersected by the latter's longitudinal seam, for example, a depression may be provided in the anvil to accommodate the fillet-seam section which is enlarged by the longitudinal seam, the size of the depression then corresponding to the oversize of the fillet-seam section.

The invention is explained below in greater detail with reference to a drawing illustrating an embodiment, where:

DETAILED DESCRIPTION OF THE INVENTION

Figure 1:
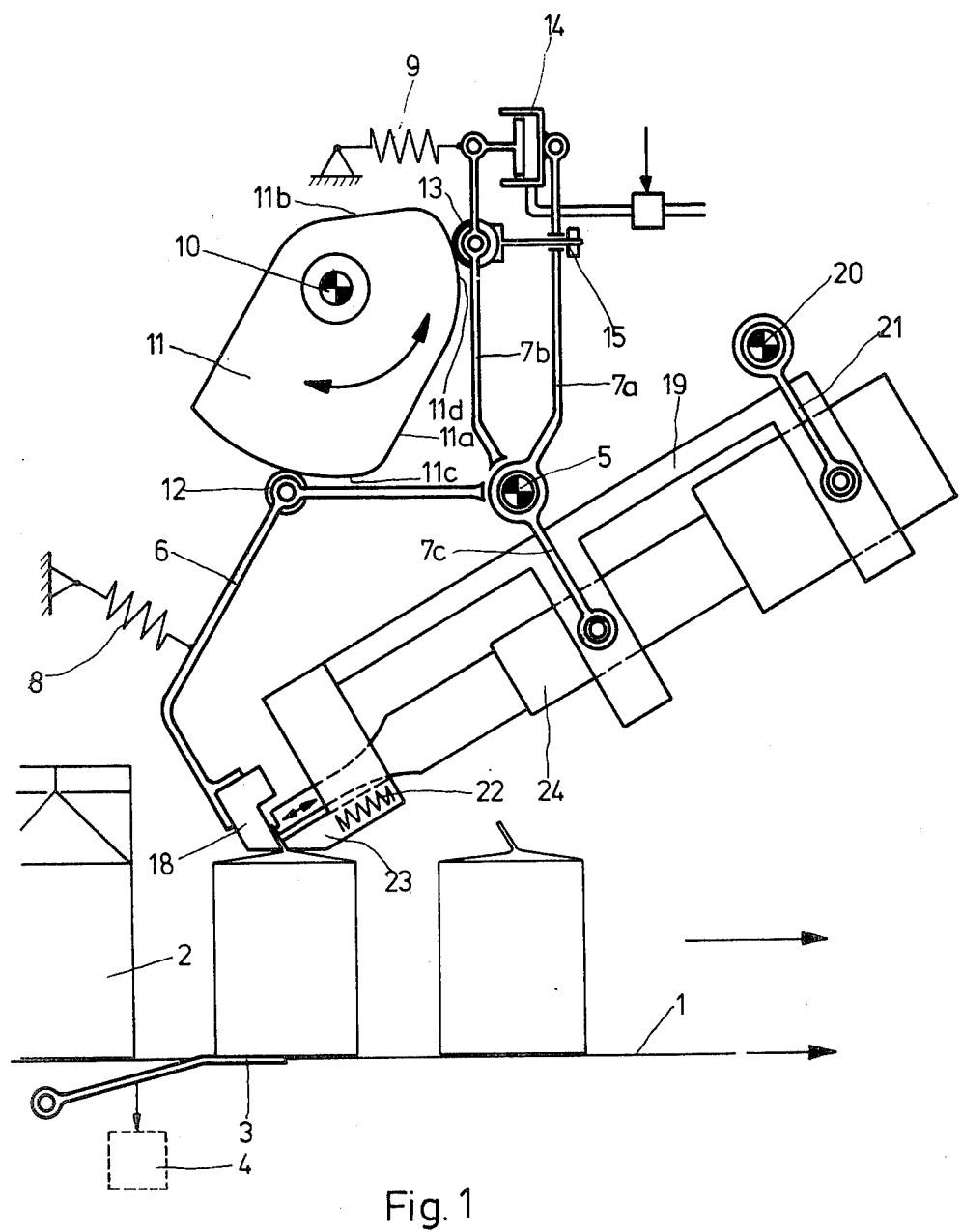
FIG. 1 is a side elevation of an apparatus for folding and closing the top of a folding carton.
Figure 2:
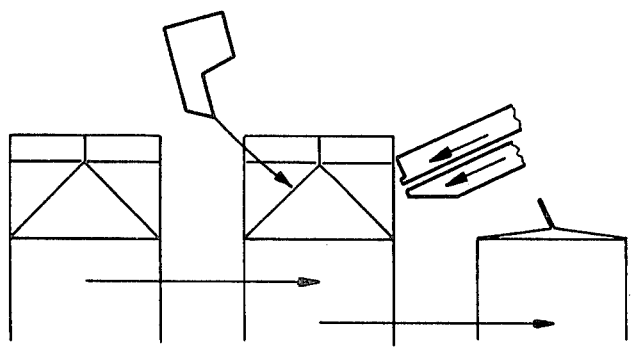
FIG. 2 shows the folding and pressing and welding tools just before the folding operation.
Figure 3:
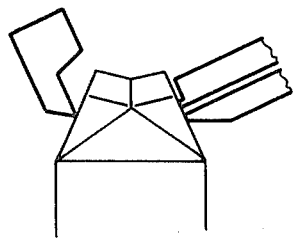
FIGS. 3 and 4 show the folding and pressing and welding tools during the folding operation.
Figure 4:
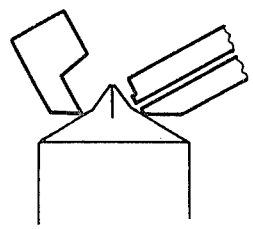

On a conveyor belt 1 the prefabricated, liquid-filled folding cartons 2, with their tops unsealed, are carried upright in a row, in a step-wise manner, with the fillet-seam areas to be welded extending at right angles to the direction of travel, to the combined folding and pressing/welding station. The presence of a folding carton under the station is detected by a sensor 3, which, through control means 4, causes the ultrasonic pressing-/welding station to be cut in.

The actuating mechanism of the combined folding and pressing/welding station consists essentially of two lever arms 6, 7a and 7b pivoted on a common fixed point 5 of the machine frame (not shown). Through springs 8 and 9, the lever arms 6 and 7b are maintained in contact with a disk cam 11 which is driven to oscillate about a fixed point 10, with the lever arms bearing on the periphery of the disk cam 11 through followers 12 and 13, constructed as rollers. The disk cam 11 is designed so that it has a steeply rising cam section 11a, 11b and a gently rising cam section 11d, 11c for each lever arm 6, 7b.

Figure 8:
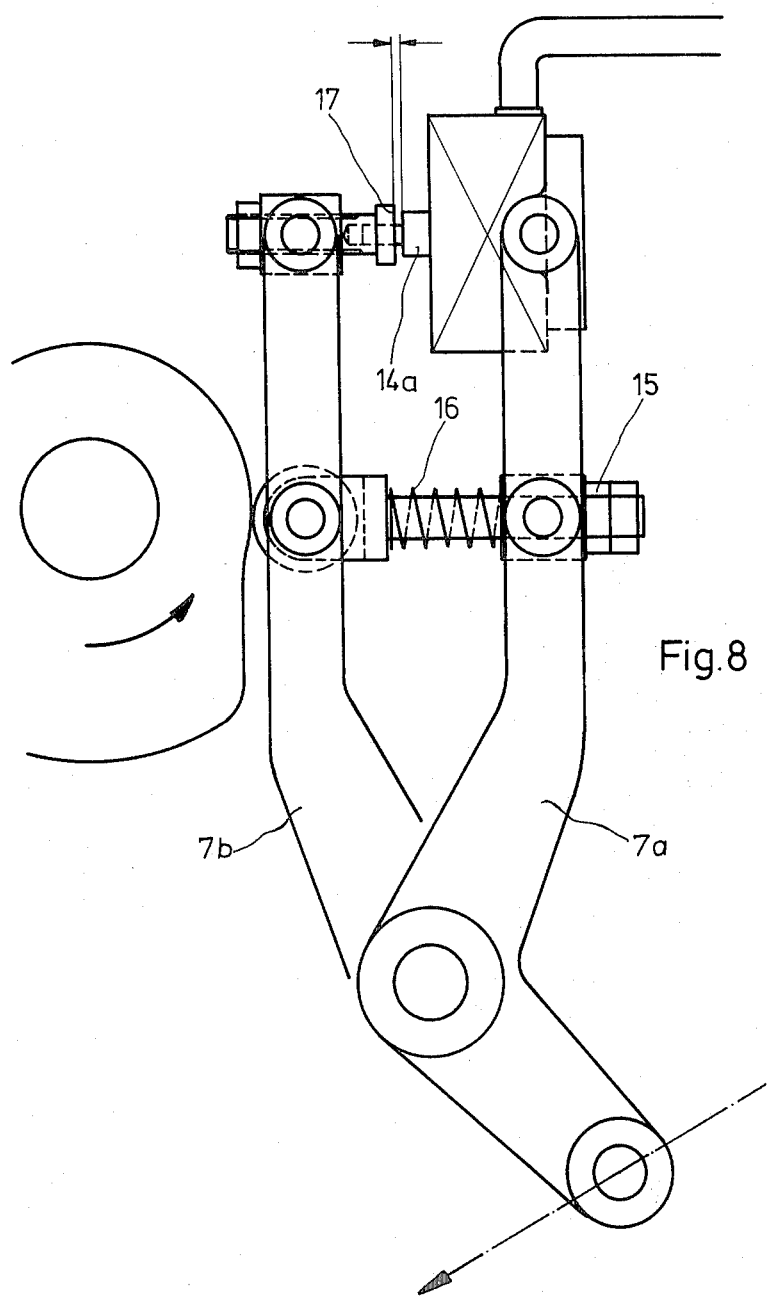
FIG. 8 is an enlarged view of an actuating arm for the welding tool constructed as an ultrasonic generator/transducer assembly shown in FIG. 1.

The lever arm 7a, 7b is of two-part construction. In the simplest case (FIG. 1), the free ends of the two parts 7a and 7b are coupled to each other through a pressure cushion in the form of a cylinder-piston arrangement 14 which is under constant pressure. The maximum angle between the two parts 7a and 7b is limited by a stop 5. In the embodiment according to FIG. 8, the two parts 7a and 7b are, in addition, spread apart by the spring 16. Until the station is brought into the operation position, the part 7a abuts the stop 15. In this position there is an air gap between the plunger 14a of the piston of the cylinder-piston arrangement 14 and an adjustable stop 17 on part 7b.

The free end of the lever arm 6 carries a jaw 18 which in the lower portion, is provided with a folding wedge 18a and in the upper portion with an anvil 18b having a surface of slightly rounded cross section. Between the folding wedge 18a and the anvil 18b there is a groove 18c. The folding wedge 18a also serves as clamping tool.

While lever arm 6 is of one-arm construction, part 7a has two arms. To the free arm 7c and link arm 21 pivoted on a fixed point 20 of the machine frame there is articulated, in the manner of a parallel guide, a holder 19 for the folding and pressing/welding tool. Supported on a spring 12 in the holder 19 is a jaw 23 which cooperates with the folding wedge 18a. Like the folding wedge 18a, the jaw 23 also serves as a clamping tool. Also mounted in the holder 19 is an ultrasonic generator/transducer assembly 24 adapted to generate vibrations in the directions indicated by the arrows at a frequency of about 20 kHz. In the operating position, a gap 25 is provided between the folding and clamping tool 23 and the tip 24a of the ultrasonic generator/transducer assembly 24 which is opposite the groove 18c.

Figure 5:
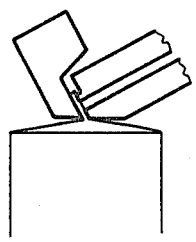
FIG. 5 shows the folding and pressing and welding tools during the pressing and welding operations.
Figure 6:
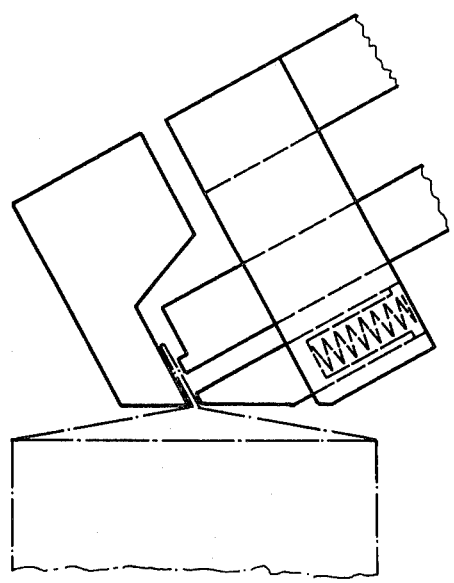
FIG. 6 is an enlarged view of the tools according to FIG. 5.

The principle of operation of the apparatus described is as follows:

Normally the individual folding cartons 2 are carried by the conveyor belt 1 in close sequence but stepwise to the processing station. As soon as the filled container, open at the top, is under the processing station, the motions of the folding and pressing tools are initiated through the disk cam 11. The steeply rising cam sections 11a and 11b then become operative first so that long paths are traveled at relatively low forces. Since these forces are lower than the force of the spring 16, the lever-arm parts 7a and 7b remain spread apart. This folding operation is illustrated in FIGS. 2 to 5, with FIG. 5 illustrating both the end position of the folding operation and the position for the pressing and welding operation. The folding wedges 18a and 23 are disposed so that the fillet seam is slightly inclined at the end of the folding operation in order that it may subsequently be turned down with greater ease. As soon as the folding and pressing/welding tools come together after the completion of the folding operation (FIG. 5), the gently rising cam sections 11c and 11d become operative. From here on the requisite higher pressing force can be applied. The force of the spring 16 then is overcome, and after the gap between the plunger 14a and the adjustable stop 17 has been closed, the pressing/welding tool is pressed with its tip 24a against the fillet seam with increased force. The length of time which it takes to close the gap is utilized to cut in the ultrasonic generator/transducer assembly. This is a good time because on the one hand the fillet-seam areas to be welded to one another are already held firmly together while on the other hand the contact pressure of the ultrasonic generator/transducer assembly is not yet so high that it would render cutting in the ultrasonic generator/transducer assembly difficult. Once the gap is closed, a constant pressure is applied to the fillet seam, regardless of its thickness tolerances, because the interposed cylinder-piston arrangement 14, which is under cnstant pressure, compensates for thickness variations.

Figure 7:
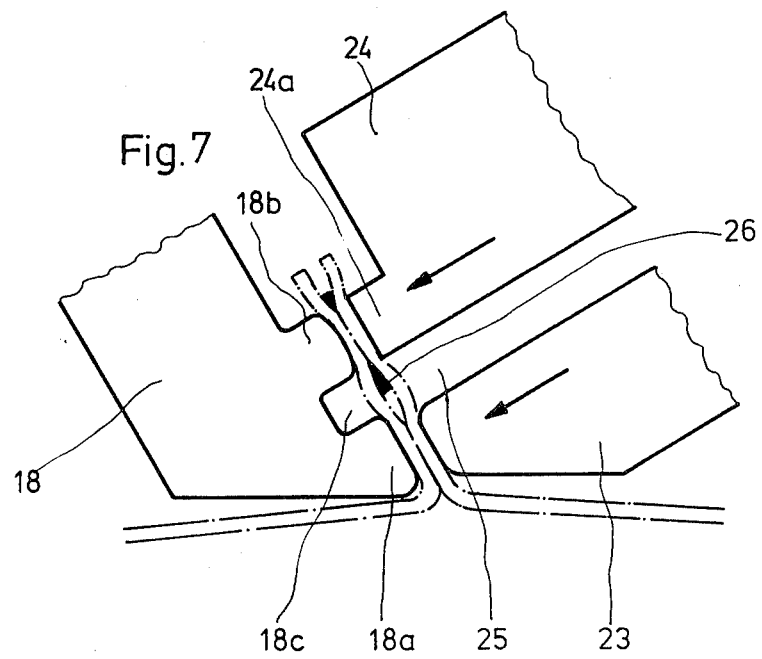
FIG. 7 is an enlarged view of the tools according to FIG. 6 after the welding operation.

From FIG. 7 it is apparent that the thermoplastic material on the insides of the fillet seam which has been softened ultrasonically is displaced toward the edges. Because of the curved surface of the anvil 18b, the pressure drops steadily toward the interior of the carton. The expelled thermoplastic material therefore is able to flow into the area of the fillet seam, with formation of a V-seam 26, where the groove 18c and the gap 25 permit arching of the fillet-seam areas. Since during the sealing operation the anvil 18b and the tip 24a of the ultrasonic generator/transducer assembly merely serve to soften the thermoplastic material while the job of holding the fillet-seam areas together is performed by the combined folding and clamping tools 18a and 23, a satisfactory weld free of gaps is produced.

However, the major advantage of the invention is that it makes it possible to convey rectangular folding cartons at right angles to the direction of travel and to close the top of the carton completely at a single station.

We claim:

1. An apparatus for folding and closing the top of folding cartons prefabricated from cut boxboard stock having an inner thermoplastic-resin liner, comprising means for stepwise conveying the folding cartons in a row, upright, with the fillet seam of the carton perpendicular to the direction of travel, and a single folding, pressing and welding station having ultrasonic welding means including a vibratable tip and a pressing and welding tool comprising a pair of jaws and the tip, means mounting the jaws for movement toward each other in the manner of tongs wherein one of said jaws includes a folding wedge and an anvil above said folding wedge, the other jaw being configured as a folding and clamping wedge, and means mounting the jaws and the ultrasonic vibrating means in a common holder for movement into and out of engagement with the fillet seam of each carton on the conveying means.

2. An apparatus according to claim 1, wherein the means mounting the jaws for movement comprise cam sections which effect movement of the common holder.

3. An apparatus according to claim 2, wherein a steeply rising cam section is provided for the folding operation and a gently rising cam section is provided for the pressing operation.

4. An apparatus according to claim 2 or claim 3, comprising a single cam having the cam sections thereon and which is mounted for oscillatory movement.

5. An apparatus according to claim 2 or claim 3, wherein the means mounting the jaws further comprises a follower bearing on the cam sections, and a compression spring between the follower and the holder with a stop which becomes operative only after the force of the spring has been overcome coming into operative engagement therewith.

6. An apparatus according to claim 2, further comprising means including a cylinder-piston arrangement which is under constant pressure between the common holder and the cam sections for providing a pressure cushion.

7. An apparatus according to claim 1, wherein the anvil and the tip are disposed at a short distance from the pressing area of the clamping wedge.

8. An apparatus according to claim 7, wherein the anvil is provided with a rib of rounded cross section extending in the direction of the fillet seam and serving as an abutment surface for the tip.

9. An apparatus according to claim 1, wherein the anvil is provided with at least one depression accommodating an elarged fillet-seam section, the size of the depression corresponding to the oversize of the enlarge fillet-seam section.

* * * * *